United States Patent
Kobayashi et al.

(10) Patent No.: US 8,883,338 B2
(45) Date of Patent: Nov. 11, 2014

(54) DRY-BATTERY HOUSING

(71) Applicant: Brother Kogyo Kabushiki Kaisha, Nagoya (JP)

(72) Inventors: Shinji Kobayashi, Tokoname (JP); Kazuma Hojo, Inazawa (JP); Masashi Tanizaki, Kuwana (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 4 days.

(21) Appl. No.: 13/625,910

(22) Filed: Sep. 25, 2012

(65) Prior Publication Data

US 2013/0171489 A1    Jul. 4, 2013

(51) Int. Cl.
*H01M 2/10* (2006.01)

(52) U.S. Cl.
USPC ............ 429/100; 320/110; 320/111; 320/112

(58) Field of Classification Search
USPC .................................. 429/100; 320/110–112
See application file for complete search history.

(56) References Cited

U.S. PATENT DOCUMENTS

| | | | | |
|---|---|---|---|---|
| 4,514,477 A | * | 4/1985 | Kobayashi | 429/98 |
| 5,208,525 A | * | 5/1993 | Lopic et al. | 320/112 |
| 5,607,795 A | * | 3/1997 | Saida | 429/100 |
| 6,271,644 B1 | * | 8/2001 | Okada et al. | 320/112 |
| 6,603,670 B1 | * | 8/2003 | Chien | 361/801 |
| 6,696,817 B2 | | 2/2004 | Awatsu et al. | |

FOREIGN PATENT DOCUMENTS

| | | | | |
|---|---|---|---|---|
| JP | 09-092244 | * | 4/1997 | H01M 2/10 |
| JP | 4025557 | | 12/2007 | |

* cited by examiner

*Primary Examiner* — Milton I Cano
*Assistant Examiner* — Michael Dignan
(74) *Attorney, Agent, or Firm* — McCarter & English, LLP (57) ABSTRACT

A dry-battery housing includes an electrode terminal member made of a single wire, a dry-battery housing unit, a flange portion arranged so as to project at first side of the electrode terminal member, a first partition plate projecting along outside for first side of the electrode terminal member, a second partition plate projecting along outside for second of the electrode terminal member, a first fixing plate projecting from the first partition plate toward the second partition plate, a second fixing plate projecting from the second partition plate toward the first partition plate, a flange-root portion including a narrow space portion for allowing insertion and removal of a rim at the first side of the electrode terminal member and an engagement portion arranged between the narrow space portion of the flange-root portion and a border of an opening portion of the dry-battery housing.

5 Claims, 9 Drawing Sheets

DRY-BATTERY HOUSING

CROSS REFERENCE TO RELATED APPLICATIONS

The present application claims priority from Japanese Patent Application No. JP 2011-287892 filed on Dec. 28, 2011, the disclosure of which is incorporated herein by reference in its entirety.

TECHNICAL FIELD

The disclosure relates to a dry-battery housing that includes an electrode terminal member made of a single wire.

BACKGROUND OF ART

There has conventionally been known a battery box that includes inside a spring-like negative electrode as electrode terminal member made of a single wire. Since the spring-like negative electrode is fixed to a concave-shaped housing unit of the battery box, the negative electrode can cope with strong contact force of a dry battery inserted therein.

The spring-like negative electrode tends to get deformed due to impact thereon, and the like. Despite this tendency, replacement of the negative electrode has not been carried out easily; the negative electrode is fixed to the housing unit.

SUMMARY

The present disclosure has been made to overcome the above problems and the object of the disclosure is to provide a dry-battery housing that is capable of facilitating replacement of an electrode terminal member made of a single wire.

A dry-battery housing directed to the disclosures for achieving the above object, comprises: an electrode terminal member made of a single wire; a dry-battery housing unit that is a hollow portion defined by an opening portion, a side wall portion and a bottom portion; a flange portion that projects from one border toward the other border of the opening portion of the dry-battery housing unit, at the first side of the electrode terminal member that is arranged so as to face the side wall portion of the dry-battery housing unit; a first partition plate that projects from the side wall portion of the dry-battery housing unit toward the hollow portion thereof along an outside for the first side of the electrode terminal member that is arranged so as to face the side wall portion of the dry-battery housing unit; a second partition plate that projects from the side wall portion of the dry-battery housing unit toward the hollow portion thereof along an outside for second side of the electrode terminal member that is arranged so as to face the side wall portion of the dry-battery housing unit, the second side opposing to the first side of the electrode terminal member; a first fixing plate that projects from the first partition plate toward the second partition plate is independent of the flange portion, the first fixing plate facing a rim portion at the first side of the electrode terminal member that is arranged so as to face the side wall portion of the dry-battery housing unit and fixing the electrode terminal member thus arranged; a second fixing plate that projects from the second partition plate toward the first partition plate is independent of the first fixed plate, the second fixing plate facing a rim portion at the second side of the electrode terminal member that is arranged so as to face the side wall portion of the dry-battery housing unit and fixing the electrode terminal member thus arranged; a flange-root portion that includes a narrow space portion formed so as to be wide enough to allow insertion and removal of a rim at the first side of the electrode terminal member, the narrow space portion being in parallel with the side wall portion and the first fixing plate; and an engagement portion that is arranged at a space between the narrow space portion of the flange-root portion and the one border of the opening portion of the dry-battery housing unit, the engagement portion fixing a first corner portion of the rim at the first side of the electrode terminal member that is arranged so as to face the side wall portion of the dry-battery housing unit.

DETAILED DESCRIPTION

[1. Electrode Terminal Member]

Figure 12:
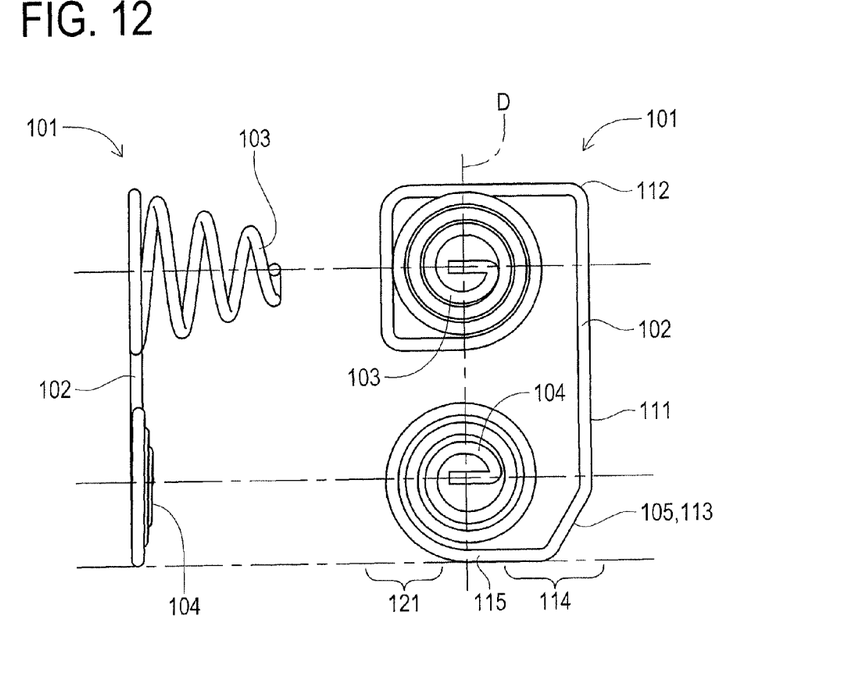
FIG. 12 shows a plane view and a side view of an electrode terminal member.

As shown in FIG. 12, especially, the plane view thereof, an outline of an electrode terminal member 101 used for a dry-battery housing is a roughly rectangular shaped when seen from top. The electrode terminal member 101 is made of a single wire 102. Inside of the roughly rectangular-shaped outline with respect to the plane view of the electrode terminal member 101, a negative terminal portion 103 and a positive terminal portion 104 are formed. The negative terminal portion 103 is formed like a coil that projects. The positive terminal portion 104 is formed like a spiral that slightly swells. Further, a corner-cut portion 105 is formed in the roughly rectangular-shaped outline with respect to the plane view of the electrode terminal member 101. The corner-cut portion 105 is a part of the single wire 102 that constitutes the electrode terminal member 101.

Here, with reference to the plane view shown in FIG. 12, the right side of the electrode terminal member 101 and the left side thereof are respectively defined as first side and second side. A rim 111 at the first side of the electrode terminal member 101 is configured to include a first corner portion 112 and a second corner portion 113. The second corner portion 113 is configured to include the corner-cut portion 105.

In FIG. 12, the lower side in common with the side view and the plane view of the figure is defined as lower side of the electrode terminal member 101. The corner-cut portion 105 is formed slantwise between a rim 115 and the rim 111, wherein the rim 115 and the rim 111 are respectively a rim at the lower side and a rim at the first side of the electrode terminal member 101 and a linear direction of the rim 115 and that of the rim 111 are made perpendicular to each other.

A part of the first side of the electrode terminal member 101 is defined as first-side rim portion 114 that ranges from the outermost part of the first side to an inward region near a central line D indicated in FIG. 12. A part of the second side of the electrode terminal member 101 is defined as second-side rim portion 121 that ranges from the outermost side of the second side to an inward region near the central line D. The first-side rim portion 114 and the second-side rim portion 121 are portions to be respectively hidden with a first fixing plate 41 and a second fixing plate 42, both of which will be described later, of the dry-battery housing when the electrode terminal member 101 is placed in the dry-battery housing.

[2. Dry-Battery Housing]

Next, there will be described on the dry-battery housing directed to the present embodiment wherein an electrode terminal member 101 of the dry-battery housing is replaceable, by referring to FIG. 1 through FIG. 11. FIG. 1 through FIG. 5 show detailed configuration of the dry-battery housing from which electrode terminal members 101 are removed. FIG. 6 through FIG. 11 show detailed configuration of the dry-battery housing in which the electrode terminal members 101 are placed. Except for the matter of presence or absence of the electrode terminal members 101, views depicted in FIGS. 6, 7, 8, 9 and 10 respectively correspond to views in FIGS. 1, 2, 3, 4 and 5.

As shown in FIG. 1 through FIG. 11, the dry-battery housing directed to the present embodiment is arranged in a dry-battery housing unit 10 installed in a body 1 of a label printer.

The dry-battery housing unit 10 is substantially made of a rectangular parallelepiped hollow portion 11 defined by an opening portion 12, side wall portion 13, a side wall portion 61 and a bottom portion 14. For arrangement of an electrode terminal member 101 to the dry-battery housing unit 10, the electrode terminal member 101 is arranged so as to face the side wall portion 13 (refer to FIG. 6 through FIG. 11). In the present embodiment, three electrode terminal members 101, each being arranged so as to face the side wall portions 13, are placed in parallel to one another and in perpendicular to the bottom portion 14 of the dry battery housing unit 10.

Flange portions 21 are arranged at both sides (namely, at first side and second side) of each electrode terminal member 101 arranged so as to face the side wall portion 13. Each flange portion 21 is arranged so as to project from a border 12A toward the side wall portion 61 that opposes to the side wall portion 13.

A first partition plate 31 is arranged at an outside with respect to first side of each electrode terminal member 101 arranged so as to face the side wall portion 13 of the dry-battery housing unit 10. Each first partition plate 31 is arranged on the side wall portion 13 so as to project toward inner of the hollow portion 11 of the dry-battery housing unit 10. Each first partition plate 31 serves to divide dry batteries 51 (refer to FIG. 9 and FIG. 10) housed in the dry-battery housing unit 10.

A second partition plate 32 is arranged at an outside with respect to second side of each electrode terminal member 101 arranged so as to face the side wall portion 13 of the dry-battery housing unit 10. Each second partition plate 32 is arranged on the side wall portion 13 so as to project toward inner of the hollow portion 11 of the dry-battery housing unit 10. Each second partition plate 32 serves to divide dry batteries 51 (refer to FIG. 9 and FIG. 10) housed in the dry-battery housing unit 10.

Figure 1:
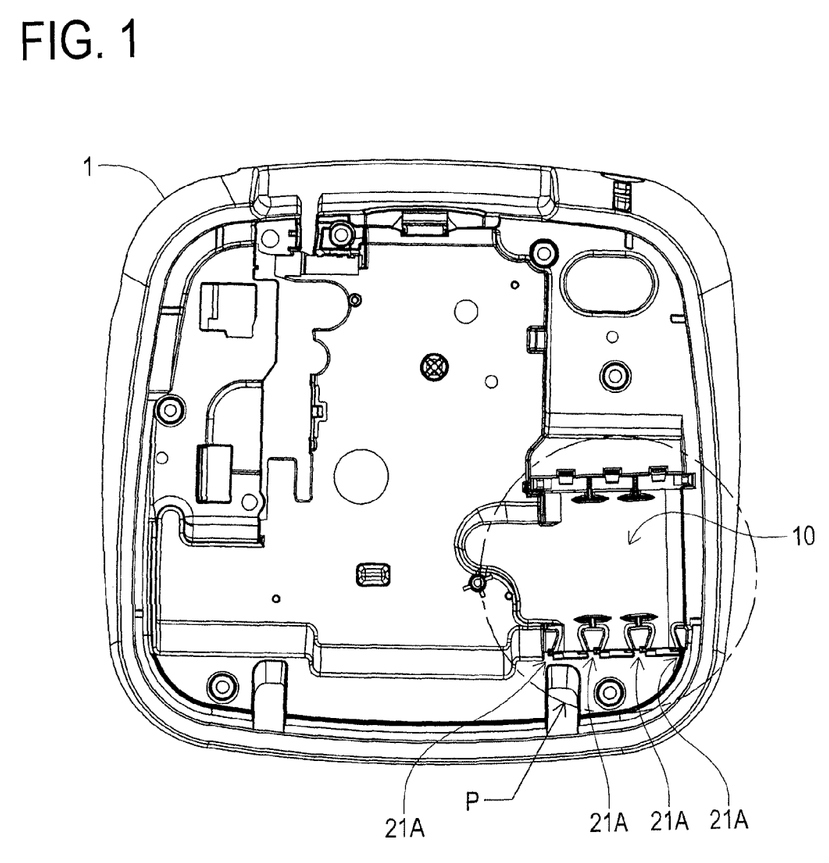
FIG. 1 is a plane view of a body equipped with a dry-battery housing directed to an embodiment of the present disclosure.
Figure 2:
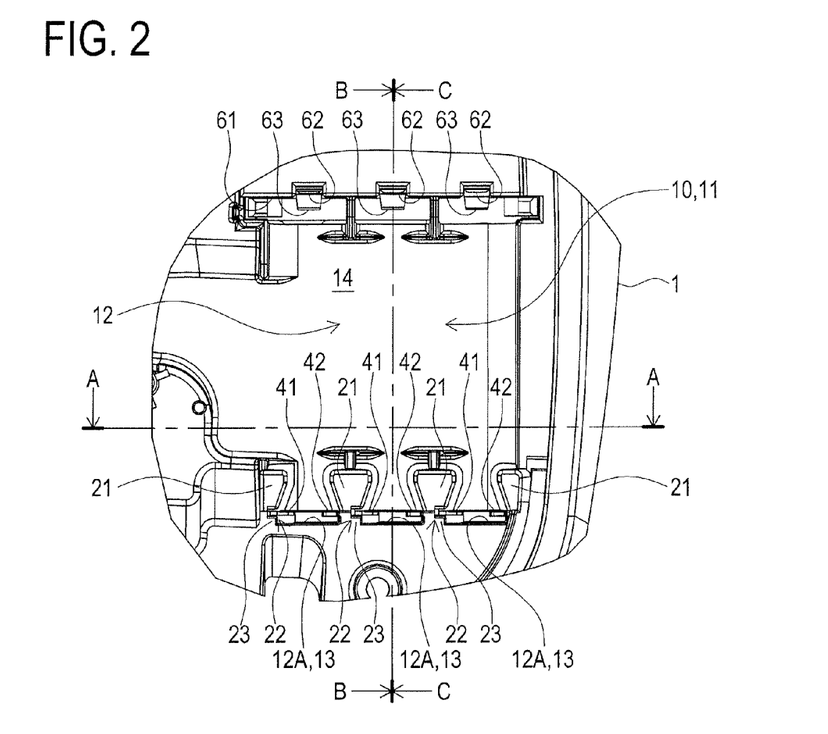
FIG. 2 is an enlarged plane view of a part P directed to FIG. 1.
Figure 3:
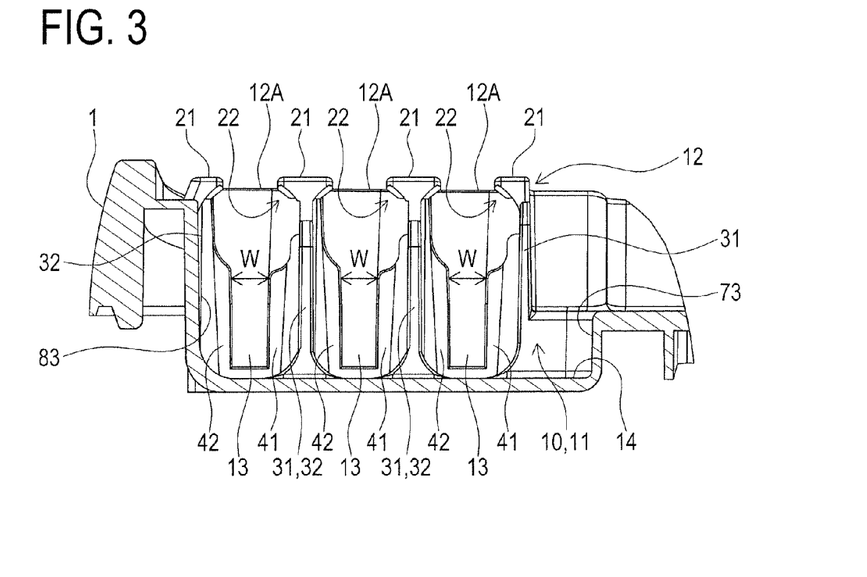
FIG. 3 is a view of the body cross-sectioned along a horizontal broken line indicated in FIG. 2 and seen from a side indicated with an arrow A.
Figure 4:
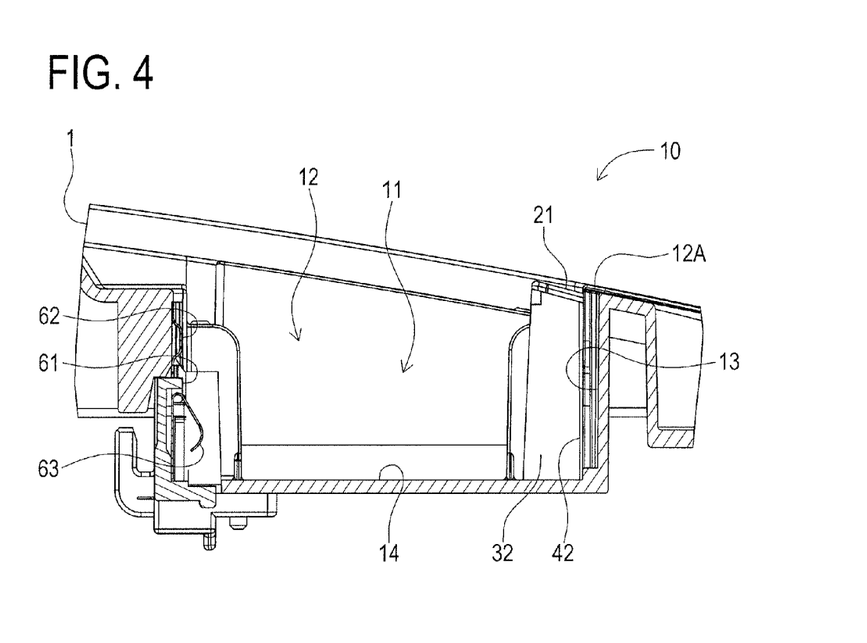
FIG. 4 is a view of the body cross-sectioned along a vertical broken line indicated in FIG. 2 and seen from a side indicated with an arrow B.
Figure 5:
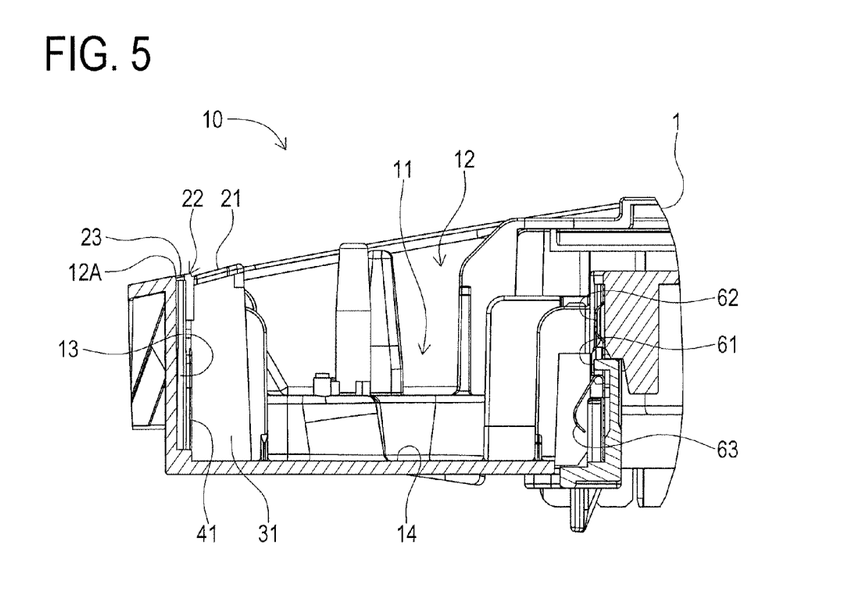
FIG. 5 is a view of the body cross-sectioned along the vertical broken line indicated in FIG. 2 and seen from a side indicated with an arrow C.
Figure 6:
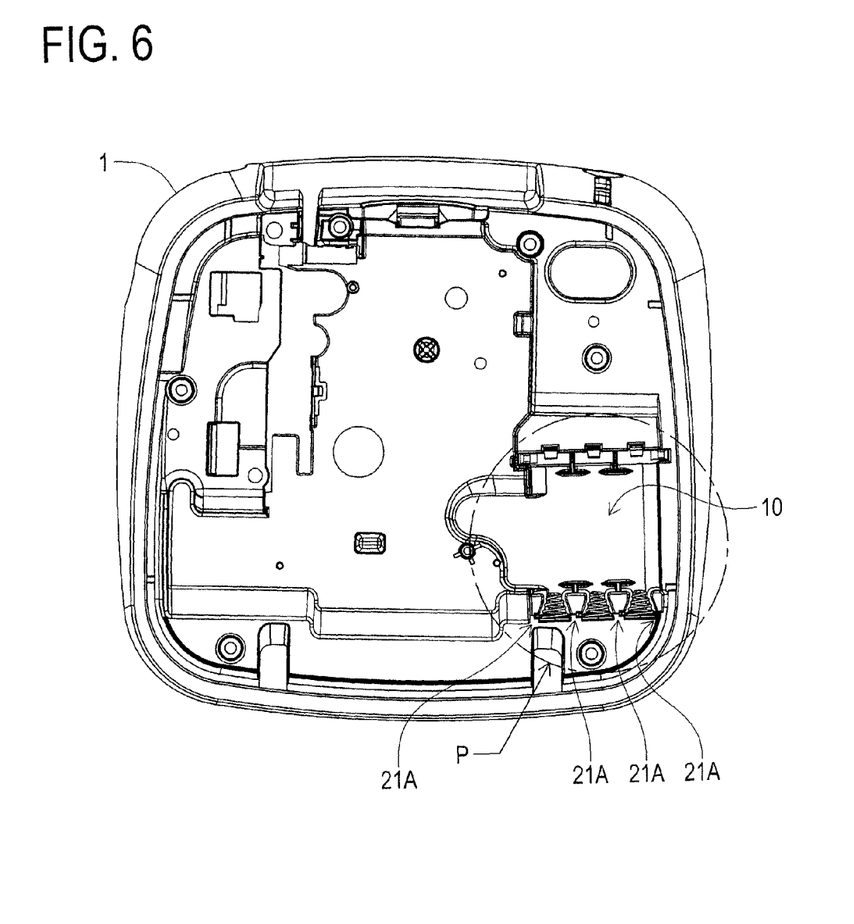
FIG. 6 is a plane view of the body equipped with the dry-battery housing directed to the embodiment of the present disclosure when electrode terminal members are attached thereto.
Figure 7:
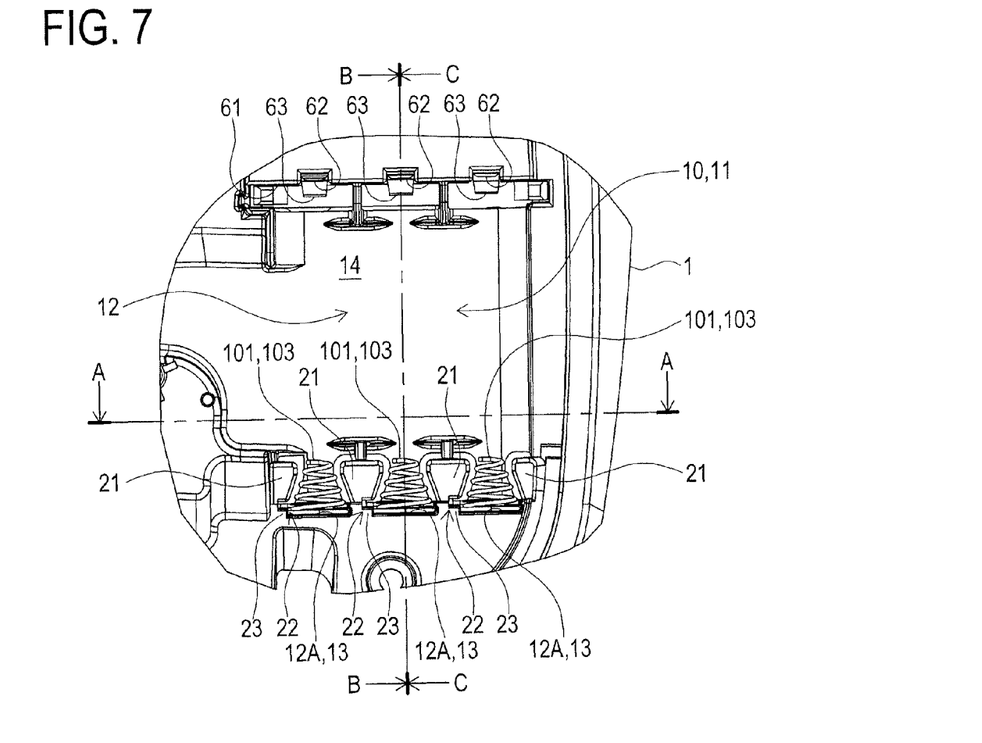
FIG. 7 is an enlarged plane view of a part P directed to FIG. 6.
Figure 8:
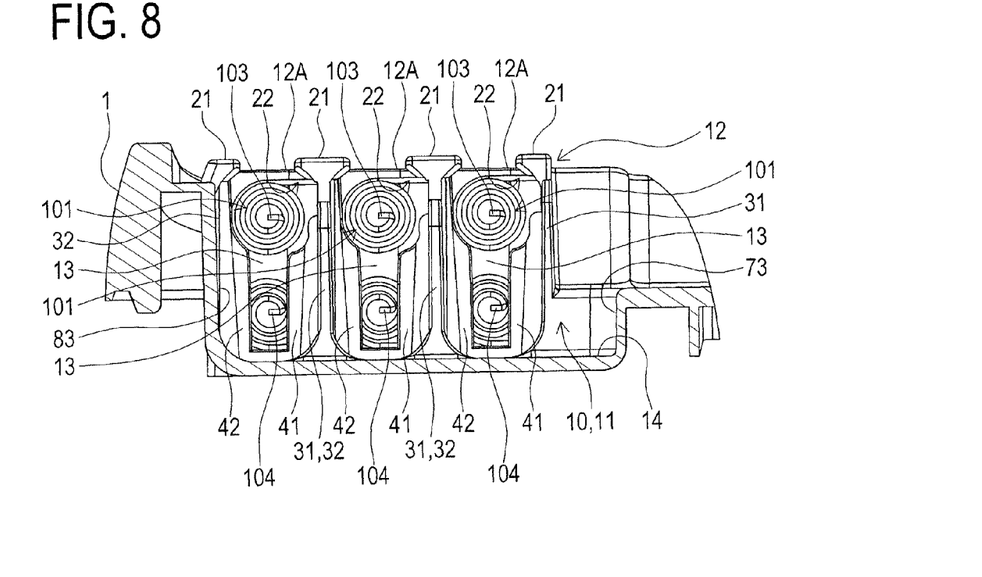
FIG. 8 is a view of the body cross-sectioned along a horizontal broken line indicated in FIG. 7 and seen from a side indicated with an arrow A.
Figure 9:
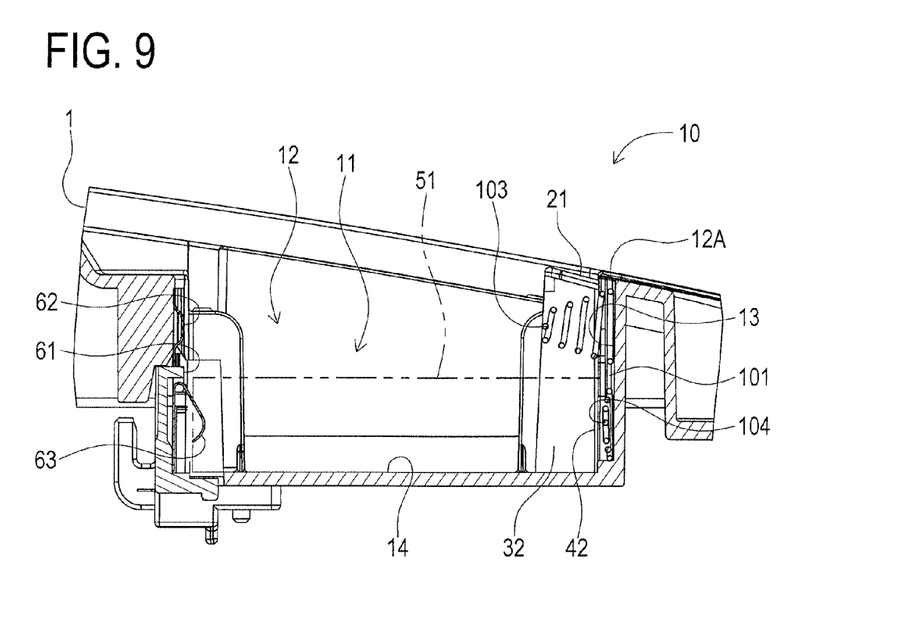
FIG. 9 is a view of the body cross-sectioned along a vertical broken line indicated in FIG. 7 and seen from a side indicated with an arrow B.
Figure 10:
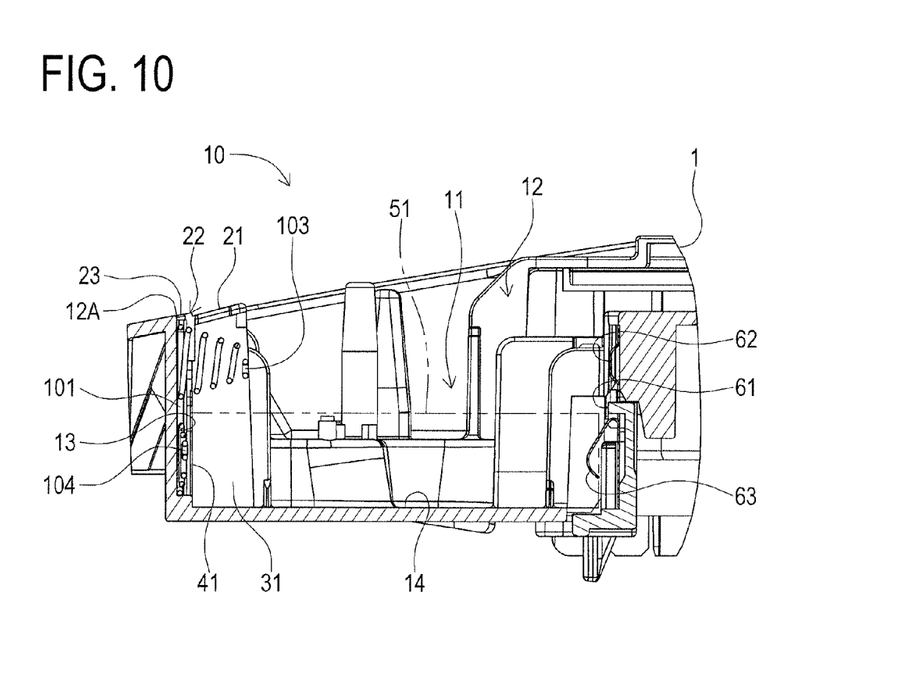
FIG. 10 is a view of the body cross-sectioned along the vertical broken line indicated in FIG. 7 and seen from a side indicated with an arrow C.
Figure 11:
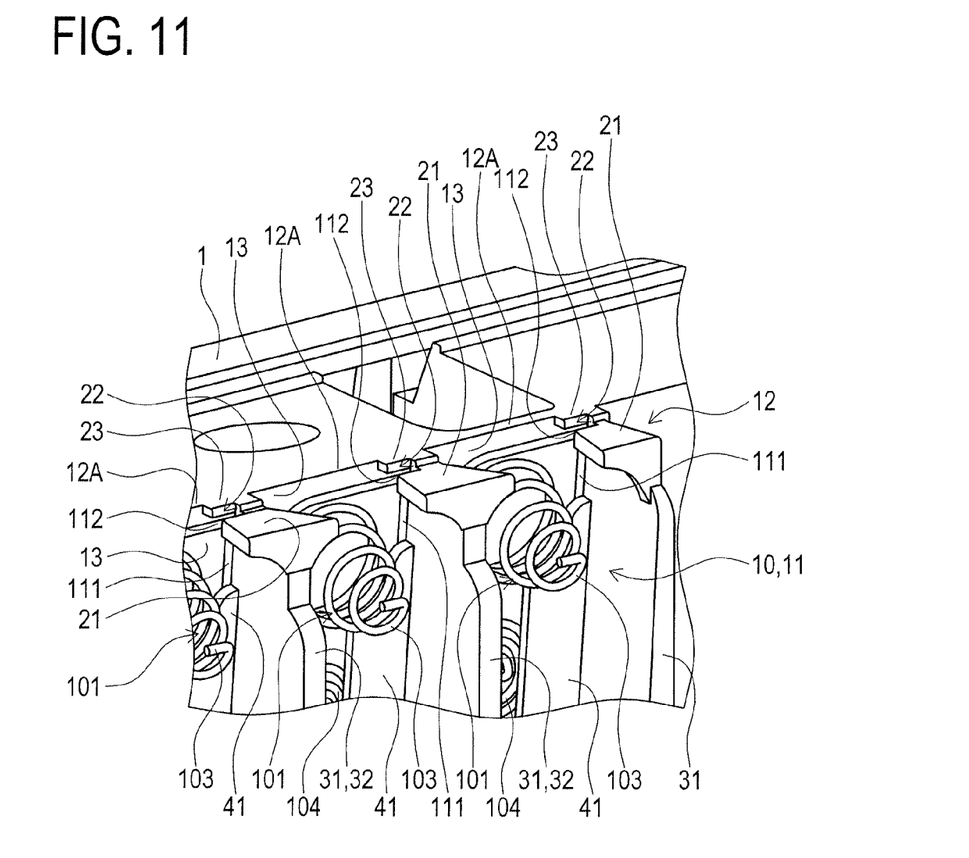
FIG. 11 is a perspective view of a dry-battery housing unit constituting the dry-battery housing directed to the embodiment of the present disclosure.

In FIG. 3 and FIG. 8, there are two partition plates each of which has indication of two kinds of numerical references 31 and 32. Each partition plate with indication of the two kinds of numerical references 31 and 32 is a double functional plate serving as first partition plate 31 and second partition plate 32 simultaneously. It is understandable from FIG. 8 that the second partition plate 32 depicted in FIG. 9 should serve as first partition plate 31 simultaneously. However, numerical reference 31 is not indicated in FIG. 9 in view of positional relation correctness; the double functional partition plate of FIG. 9 is seen from the side indicated with the arrow B in FIG. 8. More specifically, since the seeable side of the double functional partition plate in FIG. 9 should face second side of the electrode terminal member 101, only numerical reference 32 should be indicated in FIG. 9. It is also understandable from FIG. 8 that the first partition plate 31 depicted in FIG. 10 should serve as second partition plate 32 simultaneously. However, numerical reference 32 is not indicated in FIG. 10 in view of positional relation correctness; the double functional partition plate of FIG. 10 is seen from the side indicated with the arrow C in FIG. 8. More specifically, since the seeable side of the double functional partition plate in FIG. 10 should face first side of the electrode terminal member 101, only numerical reference 31 should indicated in FIG. 10. The similar numerical indication manners are applicable to FIG. 3, FIG. 4 and FIG. 5.

Each first partition plate 31 includes a first fixing plate 41 that projects toward a second partition plate 32 from the first partition plate 31 is independent of a flange portion 21. Further, the first fixing plate 41 is arranged on the first partition plate 31 so as to face a first-side rim portion 114 (refer to FIG. 12) of an electrode terminal member 101 that is arranged so as to face the side wall portion 13 of the dry-battery housing unit 10. Thereby, the first fixing plate 41 serves to fix the electrode terminal member 101 arranged so as to face the side wall portion 13 of the dry-battery housing unit 10.

Each second partition plate 32 includes a second fixing plate 42 that projects toward a first partition plate 31 from the second partition plate 32 is independent of a first fixing plate 41. Further, the second fixing plate 42 is arranged on the second partition plate 32 so as to face a second-side rim portion 121 (refer to FIG. 12) of an electrode terminal member 101 that is arranged so as to face the side wall portion 13 of the dry-battery housing unit 10. Thereby, the second fixing plate 42 serves to fix the electrode terminal member 101 arranged so as to face the side wall portion 13 of the dry-battery housing unit 10.

It is to be noted that a first fixing plate 41 and a second fixing plate 42 are present in the same plane.

Between a first fixing plate 41 and a second fixing plate 42, there is a spatial area of which width W (refer to FIG. 3) is made wider at a side heading for the opening portion 12, in other words, an upper side of the spatial area, namely, above the reference symbol W in FIG. 3. More specifically, the width W of the special area is made wider above the reference symbol W in FIG. 3 that is a portion to allow a negative terminal portion 103 of an electrode terminal member 101 to project into the hollow portion 11 of the dry-battery housing unit 10 from the plane of the first fixing plate 41 and the second fixing plate 42 when the electrode terminal member 101 is arranged so as to face a side wall portion 13 of the dry-battery housing unit 10. In this connection, since the negative terminal portion 103 of the electrode terminal member 101 is formed like a coil, outline of the first fixing plate 41 and that of the second fixing plate 42 are formed like arc in the vicinity of the reference symbol W in FIG. 3. Thus, width W of the spatial area between the first fixing plate 41 and the second fixing plate 42 is not constant.

A narrow space portion 22 is formed at a flange-root portion 21A (refer to FIG. 1 and FIG. 6), namely, at the root of a flange portion 21. The narrow space portion 22 is formed like a slit that is wide enough to allow insertion and removal of a rim 111 at first side of an electrode terminal member 101. The first fixing plate 41 has a thick portion at position between the narrow space portion 22 and the bottom portion 14 of the dry-battery housing unit 10. That is, a narrow space portion 22 is formed in a flange-root portion 21A so that shape thereof is in parallel with the side wall portion 13 and thickness of the first fixing plate 41.

It is to be noted that a narrow space portion 22 is not formed at a flange-root portion 21A provided at second side of an electrode terminal member 101 arranged so as to face a side wall portion 13 of the dry-battery housing unit 10. Regarding FIG. 2 and FIG. 7, a narrow space portion 22 is not formed at a far right flange-root portion 21A.

At a root of a flange portion 21, an engagement portion 23 is formed so as to adjoin a narrow space portion 22. More specifically, an engagement portion 23 is formed between a narrow space portion 22 of a flange-root portion 21A and the border 12A of the opening portion 12. An engagement portion 23 serves to fix a first corner portion 112 of a rim 111, at first side of an electrode terminal member 101 arranged so as to face a side wall portion 13 of the dry-battery housing unit 10.

It is to be noted that a dry battery 51 is a Ni-MH battery (nickel-metal hydride battery charger).

In the dry-battery housing unit 10, there are arranged negative terminal members 63 and positive terminal members 62 on the side wall portion 61 opposing to the side wall portion 13. Each negative terminal member 63 is a blade spring formed by folding a metallic plate and arranged at a position opposing to a positive terminal portion 104 of the electrode terminal member 101. In the present embodiment, there are arranged three negative terminal members 63 at the side of the bottom portion 14 of the dry-battery housing unit 10. Further, each positive terminal member 62 is a blade spring made of a metallic plate formed so as to swell partially and arranged at a position opposing to a negative terminal portion 103. In the present embodiment, there are arranged three positive terminal members 62 at the side of the opening portion 12 of the dry-battery housing unit 10.

[3. Function of Dry-Battery Housing]

According to the dry-battery housing of the present embodiment, the electrode terminal member 101 is arranged so as to face the side wall portion 13 of the dry-battery housing unit 10. For removal of the electrode terminal member 101, a first corner portion 112 of a rim 111 at first side of the electrode terminal member 101 is firstly displaced from an engagement portion 23 of a flange portion 21 and the rim 111 at the first side thereof is subsequently drawn out from a narrow space portion 22 of the flange portion 21, whereby the electrode terminal member 101 is thoroughly removed from the dry-battery housing unit 10.

Vice versa, for attachment of the electrode terminal member 101, the rim 111 at the first side of the electrode terminal member 101 is firstly inserted in the narrow space portion 22 of the flange portion 21, and subsequently, the rim portion 114 at the first side of the electrode terminal member 101 is inserted in a space between the side wall portion 13 and the first fixing plate 41 of the dry-battery housing unit 10 in concurrently with insertion of the rim portion 121 at second side of the electrode terminal member 101 in a space between the side wall portion 13 and the second fixing plate 42 of the dry-battery housing unit 10.

After that, the first corner portion 112 of the rim 111 at the first side of the electrode terminal member 101 is hooked up on the engagement portion 23 of the flange portion 21, whereby the electrode terminal member 101 is arranged so as face the side wall portion 13 of the dry-battery housing unit 10.

The electrode terminal member 101 arranged so as to be face the side wall portion 13 of the dry-battery housing unit 10 is made of a single wire 102. Therefore, in the dry-battery housing of the present embodiment, the electrode terminal member 101 made of a single wire 102 can be changed easily.

The first fixing plate 41 is configured to project from the first partition plate 31 is independent of the flange portion 21. By tilting the first corner portion 112 toward an open space between the first fixing plate 41 and the flange portion 21, the first corner portion 112 can be removed from the engagement portion 23 of the flange portion 21, the first corner portion 112 being a portion of the rim 111 at first side of the electrode terminal member 101 arranged so as to face the side wall portion 13 of the dry-battery housing unit 10.

By tilting the rim 111 at the first side of the electrode terminal member 101 having been inserted in the narrow space portion 22 of the flange portion 21 toward the side wall portion 13 of the dry-battery housing unit 10 at the open space between the first fixing plate 41 and the flange portion 21, the first-side rim portion 114 of the electrode terminal member 101 can be easily inserted in a space between the side wall portion 13 and the first fixing plate 41 of the dry-battery housing unit 10.

In the dry-battery housing directed to the present embodiment, the electrode terminal member 101 that is made of a single wire 102 and includes the negative terminal portion 103 formed like a coil that projects. Further, between the first fixing plate 41 and the second fixing plate 42, there is a spatial area of which width W is made wider at the side heading for the opening portion 12, in other words, an upper side of the spatial area, namely, above the reference symbol W in FIG. 3. More specifically, the width W of the special area is made wider above the reference symbol W in FIG. 3 that is a portion to allow the negative terminal portion 103 of the electrode terminal member 101 to project into the hollow portion 11 of the dry-battery housing unit 10 from the plane of the first fixing plate 41 and the second fixing plate 42 when the electrode terminal member 101 is arranged so as to face the side wall portion 13 of the dry-battery housing unit 10. Accordingly, the dry-battery housing directed to the present embodiment can facilitate replacement of the electrode terminal member 101 that is even made of a single wire 102 and includes the negative terminal portion 103 formed like a coil that projects.

In the dry-battery housing directed to the present embodiment, the corner-cut portion 105 is formed at the second corner portion 113 that is a part of the rim 111 at the first side of the electrode terminal member 101. Accordingly, by initially inserting the corner-cut portion 105 of the electrode terminal member 101 into the narrow space portion 22 of the flange portion 21, the entirety of the rim 111 at the first side of the electrode terminal member 101 can be inserted into the narrow space portion 22 of the flange portion 21 smoothly.

[4. Others]

It is to be noted that the present disclosure is not restricted to aspects of embodiments described herein and that various changes and modification may be made without departing from the gist of the present disclosure.

[4-1. Manner to House Dry Batteries in Dry-Battery Housing]

Figure 13:
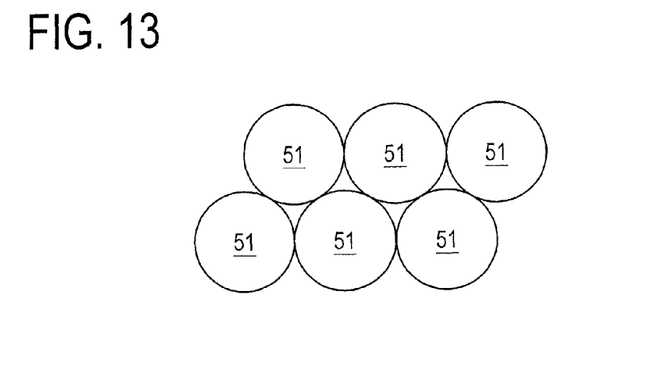
FIG. 13 is a view for illustrating an example of a manner to house dry batteries.

For instance, the dry-battery housing directed to the present embodiment is configured to house three sets of two dry batteries 51, for each set of two dry batteries 51 being arranged vertically with respect to the bottom portion 14 of the dry-battery housing unit 10. Each set of two dry batteries 51, however, may be arranged obliquely as shown in FIG. 13.

[4-2. Number of Electrode Terminal Members]

In the dry-battery housing directed to the present embodiment, three electrode terminal members 101 are arranged in parallel so as to face the side wall portion 13 of the dry-battery housing unit 10. Four or more of electrode terminal members 101 may be arranged in parallel so as to face the side wall portion 13 of the dry-battery housing unit 10.

Figure 14:
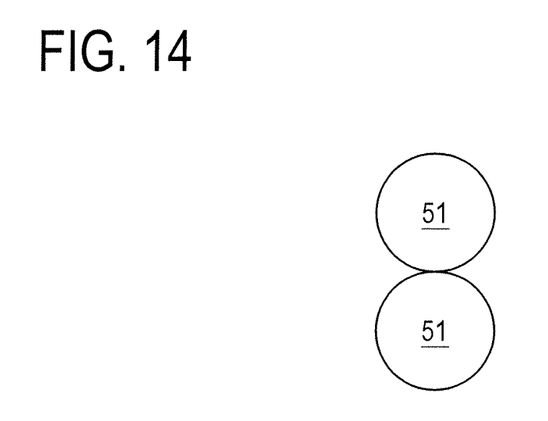
FIG. 14 is a view for illustrating other example of a manner to house dry batteries.

In the dry-battery housing directed to the present embodiment, a single electrode terminal member 101 can be arranged so as to face the side wall portion 13 of the dry-battery housing unit 10, in a case where a side wall portion 73 and a side wall portion 83 both meeting with the side wall portion 13 (refer to FIG. 3 and FIG. 8) do for a first partition plate 31 and a second partition plate 32, respectively, wherein the first partition plate 31 is normally arranged so as to project at first side of the single electrode terminal member 101 and the second partition plate 32 is normally arranged so as to project at second side of the single electrode terminal member 101. In that case, a set of two dry batteries 51 is arranged vertically with respect to the bottom portion 14 of the dry-battery housing unit 10, as shown in FIG. 14.

Figure 15:
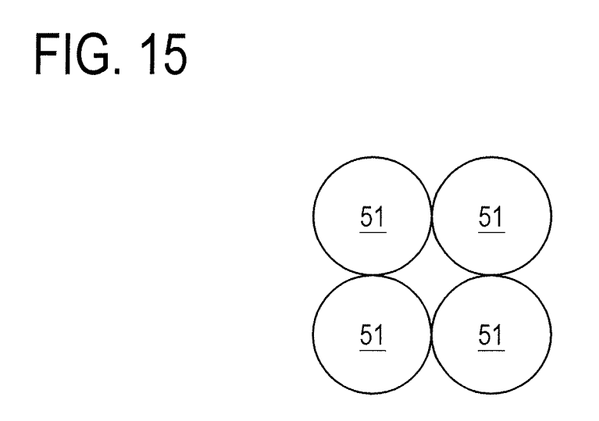
FIG. 15 is a view for illustrating other example of a manner to house dry batteries.

In the dry-battery housing directed to the present embodiment, two electrode terminal members 101 can be arranged so as to face the side wall portion 13 of the dry-battery housing unit 10, in a case where a side wall portion 73 and a side wall portion 83 both meeting with the side wall portion 13 (refer to FIG. 3 and FIG. 8) do for a first partition plate 31 and a second partition plate 32, respectively, wherein the first partition plate 31 is normally arranged so as to project at first side of one of the two electrode terminal members 101 and the second partition plate 32 is normally arranged so as to project at second side of other one of the two electrode terminal member 101. In that case, two sets of two dry batteries 51 are arranged vertically with respect to the bottom portion 14 of the dry-battery housing unit 10, as shown in FIG. 15.

[4-3. Configuration of Electrode Terminal Member]

In the dry-battery housing directed to the present embodiment, an electrode terminal member 101 is configured to include both a negative terminal portion 103 and a positive terminal portion 104. The electrode terminal member 101, however, may be configured to include only either one of terminal portions 103 and 104. In a case of an electrode terminal member 101 equipped with only a negative terminal portion 103, only a positive terminal member 62 is arranged on the side wall portion 61 of the dry-battery housing unit 10 so as to oppose to the negative terminal portion 103. In a case of an electrode terminal member 101 equipped with only a positive terminal portion 104, only a negative terminal member 63 is arranged on the side wall portion 61 so as to oppose to the positive terminal portion 104.

What is claimed is:

1. A dry-battery housing comprising:
a removable and replaceable electrode terminal member made of a single wire;
a dry-battery housing unit that is a hollow portion defined by an opening portion, a side wall portion and a bottom portion;
a flange portion that projects from one border toward another border of the opening portion of the dry-battery housing unit, at a first side of the electrode terminal member that is arranged so as to face the side wall portion of the dry-battery housing unit;
a first partition plate that projects from the side wall portion of the dry-battery housing unit toward the hollow portion thereof along an outside of the first side of the electrode terminal member that is arranged so as to face the side wall portion of the dry-battery housing unit;
a second partition plate that projects from the side wall portion of the dry-battery housing unit toward the hollow portion thereof along an outside of a second side of the electrode terminal member that is arranged so as to face the side wall portion of the dry-battery housing unit, the second side opposing to the first side of the electrode terminal member;
a first fixing plate that projects from the first partition plate toward the second partition plate and is independent of the flange portion, the first fixing plate facing a rim portion at the first side of the electrode terminal member that is arranged so as to face the side wall portion of the dry-battery housing unit and fixing the electrode terminal member thus arranged;
a second fixing plate that projects from the second partition plate toward the first partition plate and is independent of the first fixing plate, the second fixing plate facing a rim portion at the second side of the electrode terminal member that is arranged so as to face the side wall portion of the dry-battery housing unit and fixing the electrode terminal member thus arranged;
a flange-root portion that includes a narrow space portion formed so as to be wide enough to allow insertion and removal of a rim at the first side of the electrode terminal member, the narrow space portion being in parallel with the side wall portion and the first fixing plate; and
an engagement portion that is arranged at a space between the narrow space portion of the flange-root portion and the one border of the opening portion of the dry-battery housing unit, the engagement portion fixing a first corner portion of the rim at the first side of the electrode terminal member that is arranged so as to face the side wall portion of the dry-battery housing unit;
wherein the electrode terminal member comprises:
a positive terminal portion formed at a first end of the single wire, as a spiral that slightly swells; and
a negative terminal portion formed at a second end of the single wire, so as to project as a coil,
wherein a width of a spatial area between the first fixing plate and the second fixing plate is made wider at an area heading for the opening portion of the dry-battery housing unit from the negative terminal portion of the electrode terminal member, the area being wide enough to allow the negative terminal portion to project into the hollow portion of the dry-battery housing unit when the electrode terminal member is arranged so as to face the side wall portion of the dry-battery housing unit, wherein the negative terminal portion of the electrode terminal member is arranged so as to face the side wall portion of the dry-battery housing unit and is positioned closer to the opening portion of the dry-battery housing unit, with a tip thereof positioned inside the hollow portion of the dry-battery housing unit by projecting from the area, and the positive terminal portion of the electrode terminal member is arranged so as to face the side wall portion of the dry-battery housing unit and is positioned closer to the bottom portion of the dry-battery housing unit, with a tip thereof positioned outside the hollow portion of the dry-battery housing unit and merely exposed in the area, wherein, for attachment of the electrode terminal member, the rim portion at the first side of the electrode terminal member is firstly inserted in the narrow space portion of the flange-root portion, and subsequently, the rim portion at the first side of the electrode terminal member is inserted in a space between the side wall portion of the dry-battery housing unit and the first fixing plate concurrently with insertion of the rim portion at second side of the electrode terminal member in a space between the side wall portion of the dry-battery housing unit and the second fixing plate, wherein the first corner portion of the rim at the first side of the electrode terminal member is hooked up on the engagement portion, whereby the electrode terminal member is arranged so as to face the side wall portion of the dry-battery housing unit, wherein, by tilting the first corner portion of the rim at the first side of the electrode terminal member toward an open space between the first fixing plate and the flange portion, the first corner portion of the rim at the first side of the electrode terminal member can be removed from the engagement portion, the first corner potion of the rim at the first side of the electrode terminal member arranged so as to face the side wall portion of the dry-battery housing unit, and wherein the electrode terminal member connects a set of two dry batteries aligned in a depth direction of the dry-battery housing unit when the set of two dry batteries are housed therein.

2. The dry-battery housing according to claim 1, wherein the side wall portion of the dry battery housing unit functions as the first partition plate and/or the second partition plate.

3. The dry-battery housing according to claim 1, wherein the rim at the first side of the electrode terminal member has a second corner portion that is a corner-cut portion formed slantwise with respect to the rim at the first side of the electrode terminal member and another rim of which linear direction is perpendicular to linear direction of the rim at the first side thereof.

4. The dry-battery housing according to claim 1 further comprising a negative terminal member arranged at a position opposed to the positive terminal portion of the electrode terminal member, the negative terminal member comprising a blade spring formed by folding a metallic plate.

5. The dry-battery housing according to claim 1, wherein the set of two dry batteries are aligned obliquely in the depth direction of the dry-battery housing unit when the set of two dry batteries are housed therein.

* * * * *